Patented Jan. 1, 1935

1,986,411

UNITED STATES PATENT OFFICE 1,986,411

PURIFICATION OF N-MONO-ETHYL AROMATIC AMINES OF THE BENZENE SERIES

Ernest Harry Rodd and Reginald William Everatt, Blackley, Manchester, England, assignors, by mesne assignments, to E. I. du Pont de Nemours & Company, Wilmington, Del., a corporation of Delaware No Drawing. Application May 9, 1927, Serial No. 190,134. In Great Britain August 21, 1926

10 Claims.  (Cl. 260—128)

The known methods for separating tertiary aromatic amines from secondary or primary amines or from mixtures of the two have serious technical drawbacks. Methods involving the crystallization of salts of the two classes of amines give incomplete separation. Methods in which the primary and secondary amines are acylated, e. g. with acetic anhydride or p-toluenesulphochloride, are expensive, whilst the recovery of the primary and secondary amines is attended with difficulty. The use of phosgene which has been proposed, for example, for separating N mono- and N,N di-ethyl anilines, is not satisfactory, as the N,N di-ethyl aniline obtained is not usually free from N-mono-ethyl aniline, and part of the mono-ethyl aniline is lost as such, being converted into diphenyl-diethyl-urea, from which the mono-ethyl aniline cannot be recovered.

We have now discovered a method, particularly adapted to the separation of N mono- from N,N di-alkyl anilines, which has the advantage of cheapness and simplicity, whilst giving complete separation in one operation, and easy and complete recovery of both constituents as such. The process consists in treating a dry mixture of the two classes of aromatic amines with chlorosulphonic acid, whereby the secondary amine is converted into a sulphamic acid. The reaction, using an equimolecular mixture of N mono- and N,N di-ethyl anilines, is probably the following:—

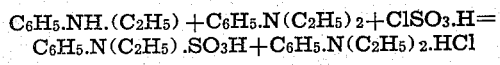

When this reaction is complete the mixture is treated with aqueous alkali, which converts the sulphamic acid into a stable salt. The N,N di-alkyl aniline can then be recovered by mechanical separation or by steam-distillation, or in any other convenient manner. A solution of the sulphamate is then acidified and boiled to hydrolyze the sulphamate:—

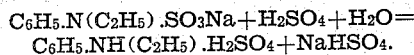

The N-mono-alakyl aniline is recovered from the solution by basification and separation by the usual methods.

The process just described works satisfactorily when the proportion of N-mono-alkyl aniline does not exceed about 15 per cent of the total; when a greater proportion is present, mechanical difficulties arise due to the separation of solid matter during addition of the chlorosulphonic acid. Mixtures containing more than 15 per cent of N-mono-alkyl aniline may be diluted with a solvent or preferably with pure N,N di-alkyl aniline, and the separation can then be carried out.

The method described is obviously applicable generally to N alkyl (including aralkyl) aromatic amines, their homologues and substitution products, when no secondary reaction arises between the amine and chlorosulphonic acid. Since primary aromatic amines also form sulphamic acids, it is also applicable to the separation of these from tertiary amines.

*Example*

250 parts of a dry mixture containing 12 per cent of N-mono-ethyl aniline and 88 per cent of N,N di-ethyl aniline are agitated vigorously in a suitable vessel, which can be cooled. During a period of about 3 hours, 35 parts of chlorosulphonic acid are run in, keeping the temperature below 20° C. When about half of the acid has been added, separation of solid commences. Stirring is continued for about 2 hours after all the acid has been added. The mixture is then diluted with 100 parts of water and strong caustic soda solution is added until a permanent alkaline reaction is obtained and a stable sodium salt is formed from the sulphamic acid produced at the expense of the monoethylaniline. The N,N di-ethyl aniline is then removed by steam-distillation; the recovery is quantitative and the quality excellent.

The residual liquors are reacidified with dilute sulphuric acid and boiled for six hours to reproduce monoethylaniline by hydrolysis. The solution is then made alkaline and the N-monoethyl aniline is recovered by steam-distillation or by mechanical separation.

The process may similarly be applied to the separation of N-mono- and N,N di-ethyl-toluidines, or of N-mono- and N,N di-methyl anilines.

What we claim and desire to secure by Letters Patent is:—

1. A process of separating N mono- and N,N diethyl anilines which consists in treating a dry mixture thereof with chlorosulphonic acid, whereby the N monoethylaniline is converted into a sulphamic acid, treating the product with aqueous alkali to convert the sulphamic acid into a stable salt, recovering the N,N diethyl aniline and hydrolyzing the sulphamic acid by treatment with acid and recovering the N monoethyl aniline.

2. The process of purifying an impure

N-mono-ethyl aromatic amine of the benzene series, which comprises the steps of treating a solution of the sulphamate of an N-mono-ethyl aromatic amine of the benzene series with acid to render it acid in reaction, boiling the resulting solution to produce the amine, rendering the solution alkaline and then separating the amine therefrom.

3. The process of purifying impure N-mono-ethyl aniline, which comprises the steps of treating a solution of the sulphamate of N-mono-ethyl aniline with acid to render it acid in reaction, boiling the resulting solution to produce the N-mono-ethyl aniline, rendering the solution alkaline and then separating the N-mono-ethyl aniline therefrom.

4. The process of purifying impure N-mono-ethyl toluidine which comprises the steps of treating a solution of the sulphamate of the N-mono-ethyl toluidine with acid to render it acid in reaction, boiling the resulting solution to liberate the N-mono-ethyl toluidine, rendering the solution alkaline, and then separating the N-mono-ethyl toluidine therefrom.

5. The process of purifying an impure N-mono-ethyl aromatic amine of the benzene series which comprises causing chloro-sulphonic acid to act upon the N-mono-ethyl aromatic amine of the benzene series, purifying the sulphamic acid thus obtained, and then decomposing the acid so as to reproduce the N-mono-ethyl aromatic amine.

6. The process of purifying impure N-mono-ethyl aniline which comprises causing chloro-sulphonic acid to act upon the N-mono-ethyl aniline, purifying the sulphamic acid thus obtained, and then decomposing the acid so as to reproduce N-mono-ethyl aniline.

7. The process of purifying impure N-mono-ethyl toluidine which comprises causing chloro-sulphonic acid to act upon the N-mono-ethyl toluidine, purifying the sulphamic acid thus obtained, and then decomposing the acid so as to reproduce the N-mono-ethyl toluidine.

8. The process which comprises causing chloro-sulphonic acid to act upon an N-mono-ethyl aromatic amine of the benzene series in the presence of an N,N di-ethyl aromatic amine of the benzene series, purifying the sulphamic acid thus produced, and then decomposing the acid so as to reproduce the N-mono-ethyl aromatic amine.

9. The process which comprises causing chloro-sulphonic acid to act upon N-mono-ethyl aniline in the presence of N,N di-ethyl aniline purifying the sulphamic acid thus obtained, and then decomposing the acid so as to reproduce the N-mono-ethyl aniline.

10. The process which comprises causing chloro-sulphonic acid to act upon N-mono-ethyl toluidine in the presence of N,N di-ethyl toluidine, purifying the sulphamic acid thus obtained, and then decomposing the acid so as to reproduce the N-mono-ethyl toluidine.

ERNEST HARRY RODD.
REGINALD WILLIAM EVERATT.